ptOffice

United States Patent Office 3,136,773
Patented June 9, 1964

3,136,773
NEW 2,5-DIBENZOXAZOLYL-THIOPHENE
DERIVATIVES
Erwin Maeder, Munchenstein, Peter Liechti, Binningen, and Adolf Emil Siegrist, Basel, Switzerland, assignors to Ciba Limited, Basel, Switzerland, a company of Switzerland
No Drawing. Filed Nov. 6, 1962, Ser. No. 235,873
Claims priority, application Switzerland Nov. 27, 1961
8 Claims. (Cl. 260—307)

The present invention provides new, valuable 2:5-dibenzoxazolyl-thiophene compounds corresponding to the general formula

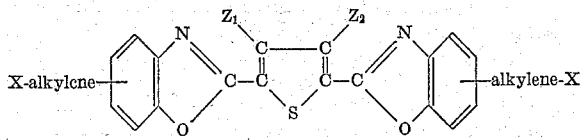

in which X stands for a free or neutralized carboxyl group (—COO cation) or a functionally converted carboxyl group, and $Z_1$ and $Z_2$ are identical or different, each representing a hydrogen atom or a methyl group.

The alkylene group in the radical -alkylene-X of the Formula 1 may be linear or branched and contain, for example, up to 12 carbon atoms. Suitable functionally converted carboxyl groups are carboxylic acid halide groups, more especially the acid chloride group

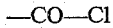

carboxylic acid ester groups, preferably carboxylic acid alkyl ester groups, the carboxylic acid nitrile group —CN, carbonamide groups (—CO—$NH_2$ and amide groups organically substituted at the nitrogen) and carboxylic acid hydrazide groups.

From among the new 2:5-dibenzoxazolyl-thiophene compounds of the composition defined above there may be mentioned, for example, those of the formula

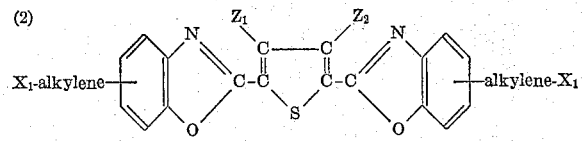

in which $X_1$ stands for a free or neutralized carboxyl group of the formula —COO cation, a carboxylic acid nitrile group, a carboxylic acid alkyl ester group, a carbonamide group or a carboxylic acid hydrazide group, the alkylene group being of low molecular weight, that is to say containing 1 to 6 carbon atoms and corresponding, for example, to one of the formulae

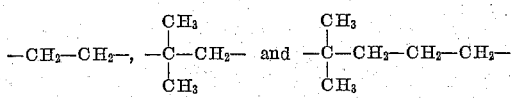

and $Z_1$ and $Z_2$ may be identical or different, each representing a hydrogen atom or a methyl group. Among the aforementioned 2:5-dibenzoxazolyl-thiophene compounds those deserve special mention which correspond to the formula

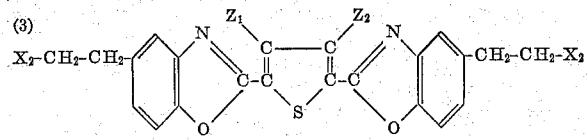

in which $X_2$ represents one of the groups —COOH, —CN, —COOR (where R is an alkyl radical with 1 to 4 carbon atoms) or a carbonamide group or a carboxylic acid hydrazide group, and $Z_1$ and $Z_2$ may be identical or different, each representing a hydrogen atom or a methyl group.

The new 2:5-dibenzoxazolyl-thiophene compounds of the above general Formula 1 are prepared by known methods, for example by reacting, with or without intermediate isolation, at an elevated temperature and preferably in the presence of a catalyst an ortho-hydroxyaminobenzene in the molecular ratio of 2:1 with a dicarboxylic acid of the formula (4)

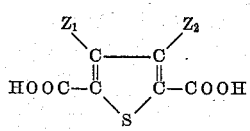

where $Z_1$ and $Z_2$ may be identical or different, each representing a hydrogen atom or a methyl group—or with a functional derivative of such a dicarboxylic acid, using an ortho-hydroxyaminobenzene of the formula (5)

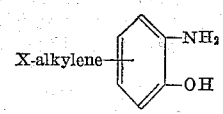

where X is a free or neutralized carboxyl group or a functionally converted carboxyl group and, if desired, converting in the resulting product a free carboxyl group into a functionally modified carboxyl group or hydrolyzing a functionally converted carboxyl group or converting it into another functionally modified carboxyl group.

Particularly suitable starting materials are, for example, the ortho-hydroxyaminobenzenes of the formula (6)

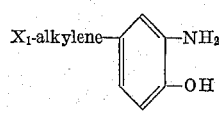

in which the alkylene group contains 1 to 12, preferably 2, carbon atoms and $X_1$ represents for instance a carboxylic acid nitrile, carbonamide or carboxylic acid ester group. Ortho-hydroxyaminobenzenes of this kind can be prepared in known manner by coupling a diazonium salt, for example diazotized aniline, with a hydroxy compound of the formula (7)

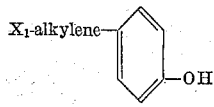

where $X_1$ has the above meaning—and splitting the resulting azo compound by reduction with, for example, sodium hydrosulfite, to the corresponding amine.

The further starting material used is a dicarboxylic acid of the Formula 4, for example thiophene-2:5-dicarboxylic acid, or 3:4-dimethyl-thiophene-2:5-dicarboxylic acid or monomethyl-thiophene-2:5-dicarboxylic acid, or a functional derivative of one of these dicarboxylic acids, for example a dicarboxylic acid dichloride.

The reaction of the two components may be carried out without intermediate isolation by heating to an elevated temperature, for example 160 to 260° C., advantageously in an inert gas, for example in a current of nitrogen, it being preferable to conduct the reaction in the presence of a catalyst. Suitable catalysts are, for example, boric acid, zinc chloride, para-toluenesulfonic acid, also polyphosphoric acids including pyrophosphoric acid. When the reaction is performed with boric acid as catalyst, it is of advantage to use it in an amount of about 0.5 to 5% referred to the total weight of the reaction batch. It is also possible to use concomitantly high-boiling polar organic solvents such, for example, as dimethyl formamide and aliphatic (if desired etherified) hydroxy compounds, for example propylene glycol, ethylene glycol monoethyl ether or diethylene glycol diethyl ether.

The present process may also be performed in two steps by first condensing 1 molecular proportion of a dicarboxylic acid of the Formula 4 or of a functional derivative of the dicarboxylic acid, more especially of a dicarboxylic acid dichloride, with 2 molecular proportions of ortho-hydroxyaminobenzene in the presence of an organic solvent such as toluene, a xylene, chlorobenzene or nitrobenzene at an elevated temperature, followed by conversion of the resulting acyl compound into the dibenzoxazole at an elevated temperature, preferably in the presence of a catalyst.

A 2:5-dibenzoxazolyl-thiophene compound of the formula (8)

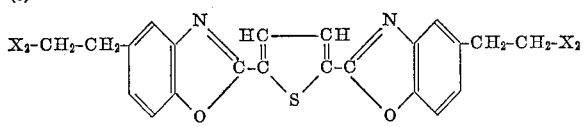

where $X_2$ represents a carboxylic acid alkyl ester group or a free carboxyl group—can be prepared, for example by condensing thiophene-2:5-dicarboxylic acid dichloride in the molecular ratio of 1:2, in the presence of an organic solvent such as toluene, with an ortho-hydroxyaminobenzene of the formula (9)

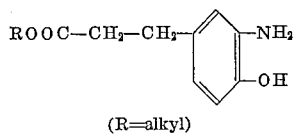

(R=alkyl)

then converting the resulting acylamino compound of the formula (10)

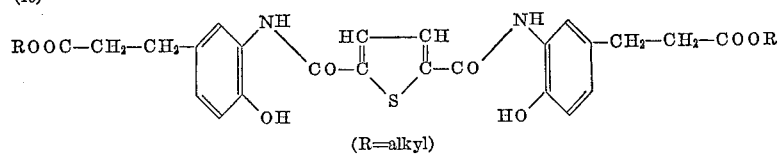

(R=alkyl)

in the presence of boric acid and of an organic solvent at an elevated temperature into the dibenzoxazole compound of the formula (11)

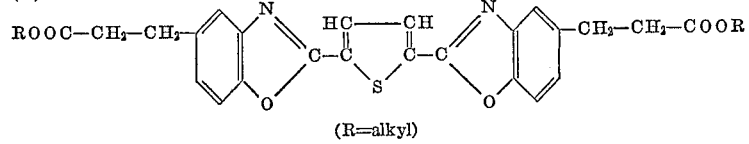

(R=alkyl)

and, if desired, hydrolyzing the carboxylic acid alkyl ester groups in known manner. The conversion of free carboxyl groups into neutralized carboxyl groups (ammonium salts, metal salts or amine salts) or into functionally modified carboxyl groups likewise follows the usual practice. Thus, for example, nitrile groups may be hydrolyzed, or free carboxyl groups esterified with organic hydroxy compounds (alcohols or phenols) or, for example with the use of thionyl chloride, converted into carboxylic acid chloride groups and the latter by treatment with ammonia or primary or secondary amines into carbonamide groups.

The new thiophene derivatives of the composition defined above display in the dissolved or finely dispersed state a more or less strongly pronounced fluorescence. They may be used for optically brightening a wide variety of materials, more especially organic materials. Good results are obtained, for example, in brightening acrylic resin lacquers, alkyd resin lacquers, cellulose ester lacquers, for example acetylcellulose lacquers, or nitrocellulose ester lacquers. Above all, the new thiophene derivatives are suitable for optically brightening synthetic fibers, for example of cellulose esters such as cellulose propionate or acetylcellulose (cellulose diacetate or cellulose triacetate; acetate rayon), polyamides (for example nylon), polyesters (for example Dacron or Terylene) or fibers of polyolefines such as polyethylene and polypropylene, of polyvinyl chloride or polyvinylidene chloride, as well as films, foils, tapes or shaped structures made from these materials or other materials such as polystyrene, polyvinyl alcohol or polyvinyl esters of organic acids, for example polyvinyl acetate.

For optically brightening by the present process synthetic fibers—which may be present in the form of staple fibers or continuous filaments, in the raw state, in the form of hanks or fabrics—it is of advantage to use an aqueous medium in which the selected thiophene compound is suspended. If desired there may be concomitantly used in the treatment dispersing agents such as, for example, as soaps, polyglycol ethers of fatty alcohol, fatty amines or alkylphenols, cellulose sulfite waste liquor or condensation products of formaldehyde with optionally alkylated naphthalenesulfonic acid. It has proved particularly advantageous to work in a neutral, weakly alkaline or acid bath. Likewise it is of advantage to perform the treatment at an elevated temperature from about 50 to 100° C., for example at the boiling temperature of the bath or in its vicinity (at about 90° C.). The improvement according to the invention may also be performed in a solution in an organic solvent.

The new thiophene derivatives to be used in the present process may also be added to or incorporated with the materials before or during their shaping. Thus for instance they may be added to the moulding composition used in the manufacture of films, foils, tapes or shaped structures, or they may be dissolved or finely dispersed in the spinning mass prior to the spinning operation. The new thiophene derivatives may also be added to the reaction batch before or during the polycondensation yielding, for example polyamides, or to the polymerization batches before or during the polymerization of monomers, for example vinyl acetate.

The amount of thiophene derivative to be used according to the invention, referred to the weight of the material to be optically brightened, may vary within wide limits. Even a very small amount—in some cases as little as 0.01%—may produce a distinct and durable effect, though it is also possible to use an amount of up to about 2%.

The new thiophene derivatives acting as brighteners may also be used in the following ways:

(a) In admixture with dyestuffs or pigments or as additives to dyebaths, printing, discharge or resist pastes. Also for after-treating dyeings, prints or discharge effects.

(b) In admixture with chemical bleaches or as additives to bleaching baths.

(c) In admixture with finishing auxiliaries, such as starch or synthetically produced finishing auxilaries. The products of the invention may, for example, also be added to the liquors used to achieve an anti-crease finish.

(d) In combination with detergents. The detergent and the brightener may be added separately to the washing liquor. It is also of advantages to use detergents that already contain a proportion of the brightener. Suitable detergents are, for example, soaps, salts of sulfonate detergents such, for example, as sulfonated benzimidazoles substituted at the 2-carbon atom by higher alkyl radicals, furthermore salts of mono-carboxylic acid esters of 4-sulfophthalic acid with higher fatty alcohols; also salts of fatty alcohol sulfonates, alkylarylsulfonic acids or condensation products of higher fatty acids with aliphatic hydroxysulfonic or aminosulfonic acids. Further suitable are non-ionic detergents, for example polyglycol ethers derived from ethylene oxide and higher fatty alcohols, alkylphenols or fatty amines.

When the present process is combined with other treatment or improvement operations, it is of advantage to perform such a combined treatment with the aid of suitable preparations. These stable preparations are distinguished by the fact that they contain compounds of the above Formula 1 as well as dispersing agents, detergents, dyestuffs, pigments or finishing auxilaries.

The compounds of the above Formula 1 may also be applied after having been fixed on a finely dispersed vehicle.

Unless otherwise indicated, parts and percentages in the following examples are by weight.

Example 1

390 parts of 4-hydroxy-3-amino-1-(2'-carbomethoxy-ethyl)-benzene are stirred below 20° C. portionwise into a solution of 209 parts of thiophene-2:5-dicarboxylic acid dichloride in 4500 parts by volume of anhydrous toluene. The grey suspension is heated to the reflux temperature, whereupon a strong evolution of hydrochloric acid is observed. When hydrochloric acid is no longer being evolved, 1500 parts by volume of toluene are evaporated, and the yellow-green suspension is cooled to 20° C. The batch is suction-filtered and the residue rinsed with a small amount of toluene.

After drying, there are obtained about 523 parts of a yellowish green powder melting at 243 to 244° C. The crude product is dissolved in boiling dioxane and the solution is filtered, concentrated and allowed to cool. The reaction mixture is suction-filtered and the residue dried, to yield about 330 parts of the compound of the formula (12)

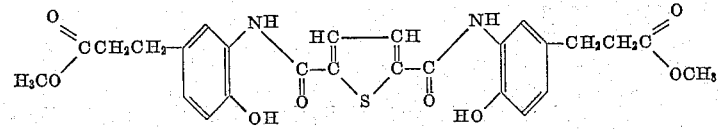

melting at 251.5 to 253° C. 600 parts of this compound are stirred with 10 parts of boric acid in 2500 parts by volume of diethylene glycol diethyl ether. The solvent is then evaporated dropwise, together with the corresponding amount of water of reaction, under nitrogen and atmospheric pressure in the course of 4 hours. The clear, dark melt obtained in this manner is allowed to cool, then pulverized and dissolved in methylene chloride. The dark solution is filtered through five times its quantity of activated alumina, evaporated to dryness and the residue is crystallized from ethyl acetate. After drying, there are obtained about 240 parts of the compound of the formula (13)

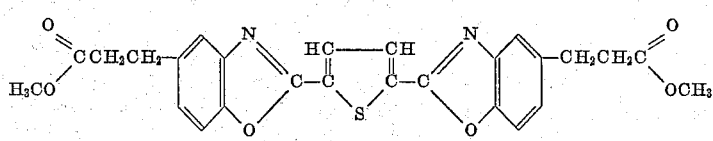

in the form of small yellowish needles melting at 146–151° C. After repeated recrystallization from benzene the compound melts at 150 to 151° C.

| Analysis: $C_{26}H_{22}N_2O_6S$ | C | H | N |
|---|---|---|---|
| Calculated, percent | 63.66 | 4.52 | 5.71 |
| Found, percent | 63.60 | 4.54 | 5.76 |

The compound of the Formula 13 is suitable for use as optical brightener for polyamides, for example nylon.

When in the process described above thiophene-2:5-dicarboxylic acid chloride is replaced by 3:4-dimethyl-thiophene-2:5-dicarboxylic acid chloride, and the condensation is performed in identical manner, there is obtained the compound of the formula (14)

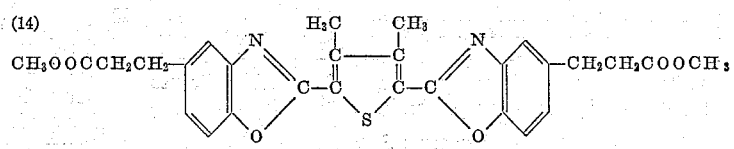

in similar purity and yield in the form of small yellowish needles from benzene, melting at 156 to 157.5° C.

| Analysis: $C_{28}H_{26}N_2O_6S$ | C | H | N |
|---|---|---|---|
| Calculated, percent | 64.85 | 5.05 | 5.40 |
| Found, percent | 64.87 | 5.07 | 5.36 |

When in the process described above 4-hydroxy-3-amino-1-(2'-carbomethoxy-ethyl)-benzene is replaced by 4-hydroxy-3-amino-1-cyanoethylbenzene, and the condensation is performed in identical manner, the compound of the formula (15)

NCCH₂CH₂-⟨⟩-N=C-C(S)-C=C-N-⟨⟩-CH₂CH₂CN is obtained in a similar yield and purity in the form of small yellowish needles from dioxane, melting at 243 to 244° C.

| Analysis: $C_{24}H_{16}N_4O_2S$ | C | H | N |
|---|---|---|---|
| Calculated, percent | 67.91 | 3.80 | 13.20 |
| Found, percent | 67.63 | 3.82 | 12.98 |

Example 2

A mixture of 190 parts of the compound of the Formula (18)

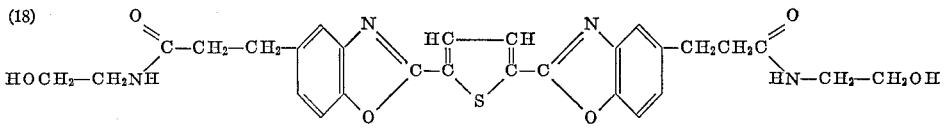

13, 4500 parts by volume of methanol and 1080 parts of sodium hydroxide solution of 30% strength is refluxed for 48 hours. The suspension is diluted with water, rendered acid to Congo red with hydrochloric acid and the methanol is evaporated. The precipitate formed is suctioned off and crystallized from glacial acetic acid, then suctioned off and dried, to yield about 142 parts of the compound of the formula (16)

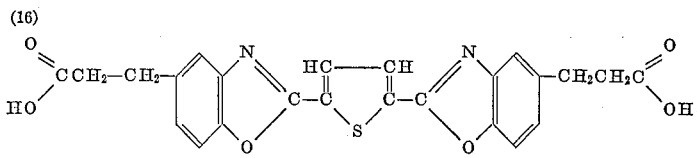

in the form of pale-yellow flakes melting at 283 to 285° C. After repeated recrystallization from glacial acetic acid the compound melts at 286 to 287° C.

| Analysis: $C_{24}H_{18}N_2O_6S$ | C | H | N |
|---|---|---|---|
| Calculated, percent | 62.33 | 3.92 | 6.06 |
| Found, percent | 62.28 | 3.98 | 5.98 |

The compound of the Formula 16 is suitable for use as optical brightener for polyamides.

Example 3

2 parts of the compound of the Formula 16 are suspended in 35 parts by volume of water and 2 N-lithium hydroxide solution, 2 N-sodium hydroxide solution, 2 N-potassium hydroxide solution or 2 N-ammonium hydroxide solution or triethanolamine solution of 10% strength is added until a clear solution of the corresponding di-alkali metal salt or di-ammonium or di-triethanolamine salt of the dicarboxylic acid of the Formula 16 has formed. At an elevated temperature about 15 parts by volume of 2 N-barium chloride solution are added dropwise, whereupon a yellow precipitate is formed spontaneously. The whole is cooled to room temperature, suction-filtered, and the filter cake is washed with water and dried, to yield about 2.3 parts of the compound of the Formula (17)

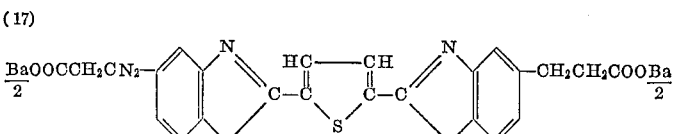

in the form of a yellow powder.

Example 4

7.4 parts of the compound of the Formula 13 are stirred with 25 parts of ethanolamine. When the mixture is heated to 150° C., there is first formed a clear solution from which after a short time the reaction product separates out. The whole is stirred on for one hour at 150° C., then cooled to room temperature, stirred with 25 parts by volume of acetone, the yellow crystal magma is suction-filtered and rinsed on the filter with acetone. After drying, there are obtained about 5.2 parts of the compound of the Formula

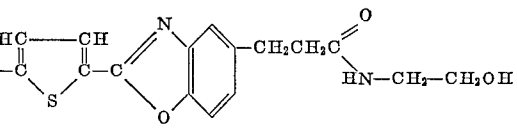

melting at 275 to 276° C. On recrystallization from dimethylformamide+ethanol there are obtained small light-yellow needles melting at 276 to 277° C.

| Analysis: $C_{26}H_{28}N_4O_6S$ | C | H | N |
|---|---|---|---|
| Calculated, percent | 61.30 | 5.14 | 10.21 |
| Found, percent | 61.06 | 5.17 | 10.10 |

The diamide of the dicarboxylic acid of the Formula 16 is obtained in a similar reaction by treating the diester compound of the Formula 13 with an excess of ammonia in ethyl alcohol.

Example 5

A mixture of 7.4 parts of the compound of the Formula 13, 20 parts by volume of dioxane and 10 parts of hydrazine hydrate is heated to the reflux temperature. On heating the yellow suspension it forms a solution. After about 15 minutes the reaction product precipitates in the form of a crystalline substance. After refluxing for 2½ hours the batch is stirred with 25 parts by volume of ethanol, cooled to room temperature, suction-filtered and the filter residue is washed with methanol and then dried, to yield about 6.8 parts of the compound of the Formula

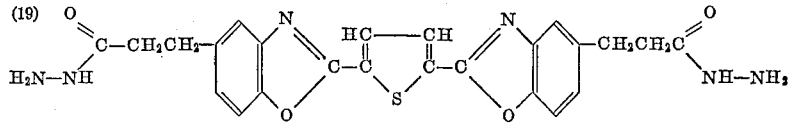

as a light yellow powder melting above 350° C. The analytically pure product is obtained from much dimethyl formamide as a finely crystalline powder.

| Analysis: $C_{24}H_{22}N_6O_4S$ | C | H |
|---|---|---|
| Calculated, percent | 58.76 | 4.52 |
| Found, percent | 58.95 | 4.60 |

Example 6

10,000 parts of a polyamide, prepared in known manner from hexamethylenediamine adipate, in chip form are mixed with 30 parts of titanium dioxide (rutile modification) and 10 parts of the compound of the Formula 13 or 15 in a tumbler for 12 hours. The chips treated in this manner are melted in a vessel heated with oil vapour or diphenyl vapour at 300 to 310° C., from which the atmospheric oxygen has been expelled by means of superheated steam, and then stirred for half an hour. The melt is then expressed through a spinneret under a nitrogen pressure of 5 atmospheres (gauge) and the resulting, cooled filament is wound on a spinning bobbin. The filaments produced in this manner display an excellent brightening effect which is fast to heat-setting and of good fastness to washing and light.

Example 7

A bleached woven fabric of polyamide staple fiber yarn is treated at a goods-to-liquor ratio of 1:30 for half an hour at 40 to 90° C. in a bath containing 0.1% (of the weight of the fiber material) of the compound of the Formula 15 or 16 and 1 cc. of acetic acid of 40% strength per liter.

After having been rinsed and dried, the fabric so treated has a higher white content than it had before the treatment.

Example 8

A melt of 100 parts of polyester (polyterephthalic acid ethylene glycol ester) and 0.05 part of the compound of $$HOOC-CH_2-CH_2-$$

the Formula 13 is expressed through a spinneret to form a tape. The polyester tape produced in this manner has a substantially higher white content than one that does not contain the thiophene compound.

Example 9

A soap (sodium salt of higher fatty acids) is prepared which contains 0.05% of the compound of the Formula 18.

Acetate rayon or cotton washed for 30 minutes at 60° C. with such a soap has a brighter aspect than material washed with a soap that does not contain the compound of the Formula 18.

What is claimed is:

1. A compound of the formula

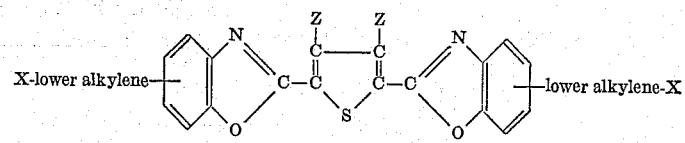

wherein X is selected from the group consisting of
(a) carboxy
(b) cyano
(c) carbo(lower)alkoxy
(d) carbamyl
(e) hydroxy(lower)alkylcarbamyl
(f) carbohydrazide
(g) —COONa
(h) —COOK
(i) —COOLi
(j) —$\frac{COOBa}{2}$
(k) —COOH·NH$_3$ and
(l) —COOH·N(CH$_2$CH$_2$OH)$_3$ and Z is selected from the group consisting of hydrogen and methyl.

2. The compound of the formula

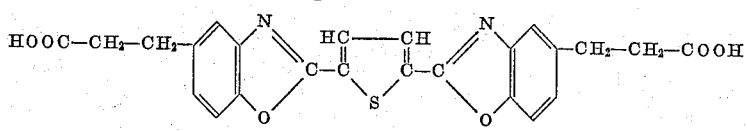

3. The compound of the formula

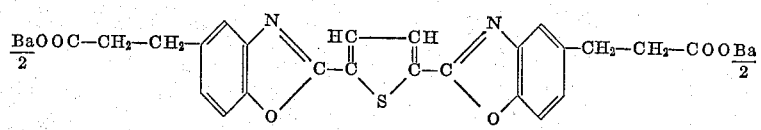

4. The compound of the formula

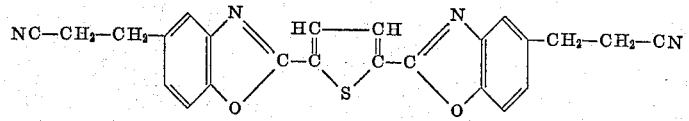

5. The compound of the formula

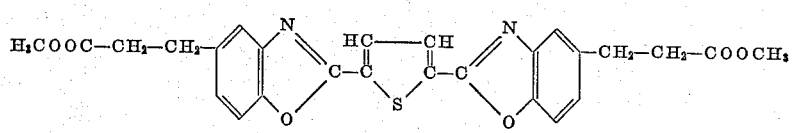

6. The compound of the formula

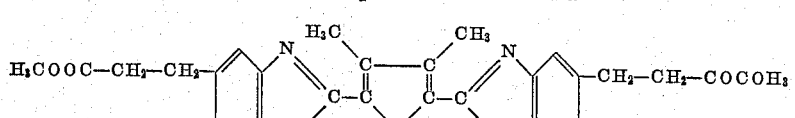

7. The compound of the formula

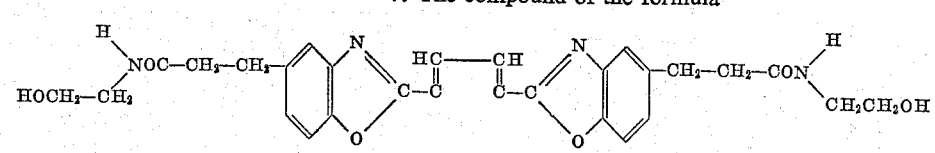

8. The compound of the formula
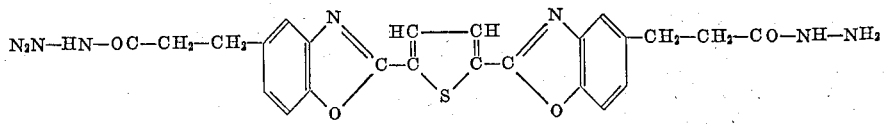
References Cited in the file of this patent
UNITED STATES PATENTS
2,995,564  Duennenberger et al. _____ Aug. 8, 1961
FOREIGN PATENTS
211,167  Australia _____ Oct. 24, 1957

UNITED STATES PATENT OFFICE
CERTIFICATE OF CORRECTION

Patent No. 3,136,773            June 9, 1964

Erwin Maeder et al.

It is hereby certified that error appears in the above numbered patent requiring correction and that the said Letters Patent should read as corrected below.

Columns 9 and 10, claim 7, the thiophene moiety at the center of the formula should appear as shown below instead of as in the patent:

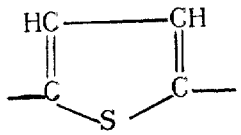

Signed and sealed this 10th day of November 1964.

(SEAL)
Attest:

ERNEST W. SWIDER
Attesting Officer

EDWARD J. BRENNER
Commissioner of Patents